United States Patent
Bell et al.

(10) Patent No.: US 8,556,577 B2
(45) Date of Patent: Oct. 15, 2013

(54) LUBE PUMP RETENTION METHOD

(75) Inventors: Melissa A. Bell, San Diego, CA (US); Michael J. Rollins, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 609 days.

(21) Appl. No.: 12/840,565

(22) Filed: Jul. 21, 2010

(65) Prior Publication Data

US 2012/0020781 A1 Jan. 26, 2012

(51) Int. Cl.
*F04D 29/60* (2006.01)

(52) U.S. Cl.
USPC ...................................... 415/122.1

(58) Field of Classification Search
USPC ............ 403/335, 336, 337; 415/122.1, 213.1, 415/214.1
See application file for complete search history.

(56) References Cited

U.S. PATENT DOCUMENTS

| | | | |
|---|---|---|---|
| 4,433,655 A * | 2/1984 | Villella | 123/196 R |
| 4,697,991 A * | 10/1987 | Tsukahara et al. | 417/219 |
| 4,734,019 A * | 3/1988 | Eberhardt | 417/440 |
| 5,090,868 A * | 2/1992 | Mosure et al. | 415/207 |
| 6,126,407 A * | 10/2000 | Guentert et al. | 417/244 |
| 6,267,094 B1 | 7/2001 | Kuettner et al. | |
| 6,601,557 B1 | 8/2003 | Hayman et al. | |
| 6,666,015 B2 | 12/2003 | Dyer | |
| 6,854,955 B2 | 2/2005 | Shaffer et al. | |
| 6,877,966 B2 | 4/2005 | Henderson | |
| 7,074,017 B2 | 7/2006 | Coray et al. | |
| 7,306,715 B2 | 12/2007 | Kato et al. | |
| 7,591,250 B2 | 9/2009 | Milton | |
| 7,617,814 B2 | 11/2009 | Leppert | |
| 7,637,724 B2 | 12/2009 | Cygnor | |
| 2009/0180827 A1 * | 7/2009 | Katcher | 403/14 |

* cited by examiner

*Primary Examiner* — Edward Look
*Assistant Examiner* — Liam McDowell
(74) *Attorney, Agent, or Firm* — Carlson, Gaskey & Olds, PC

(57) ABSTRACT

A lube pump has a housing with a flange extending radially outwardly from a body of the housing. At least one rotor is received within the housing, and a shaft for powering the rotor extends away from the flange. A retention plate is positioned on an end of the flange closing the housing. A first set of bolts secure the flange to the retention plate. A second set of bolts secure the flange to the gearbox. The two sets of bolts extend in opposed directions. A gearbox including such a lube pump is also disclosed and claimed.

20 Claims, 3 Drawing Sheets

LUBE PUMP RETENTION METHOD

STATEMENT OF GOVERNMENT INTEREST

This invention was made with government support under Contract No. N00019-06-C-0081 awarded by the United States Navy. The Government has certain rights in this invention.

BACKGROUND

This application relates to a retention method for securing a lube pump assembly for removal from a gear box without disassembly of the lube pump.

Lube pumps are utilized in any number of applications. Typically, a lube pump moves oil from a sump to various locations. One application is a gearbox.

In particular, one application is concerned with a gearbox for an auxiliary power unit, or an APU. An APU is a gas turbine engine which is utilized to provide power to an aircraft.

Presently, typical lube pump designs for the gearbox are assembled as a pre-assembly prior to attachment to the gear box. The assembly of the lube pump is such that the lube pump can be disassembled when it is detached from the gearbox as the lube pump cover is held on with the lube pump attachment bolts.

This is undesirable due to the fact that the lube pump will come apart upon disassembly from the gearbox allowing small pump components to possibly fall into the oil reservoir or fall into the aircraft compartment.

SUMMARY

A lube pump assembly has a housing with a flange extending radially outwardly from a body of the housing. At least one rotor is received within the housing, and a shaft for powering the rotor extends away from the flange. A retention plate is positioned on an end of the flange, and closing the housing. A first set of bolts secure the flange to the retention plate. A second set of bolts secure the flange to the gearbox. The two sets of bolts extend in opposed directions. A gearbox including such a lube pump is also disclosed and claimed.

These and other features of the present invention can be best understood from the following specification and drawings, the following of which is a brief description.

DETAILED DESCRIPTION

Figure 1:
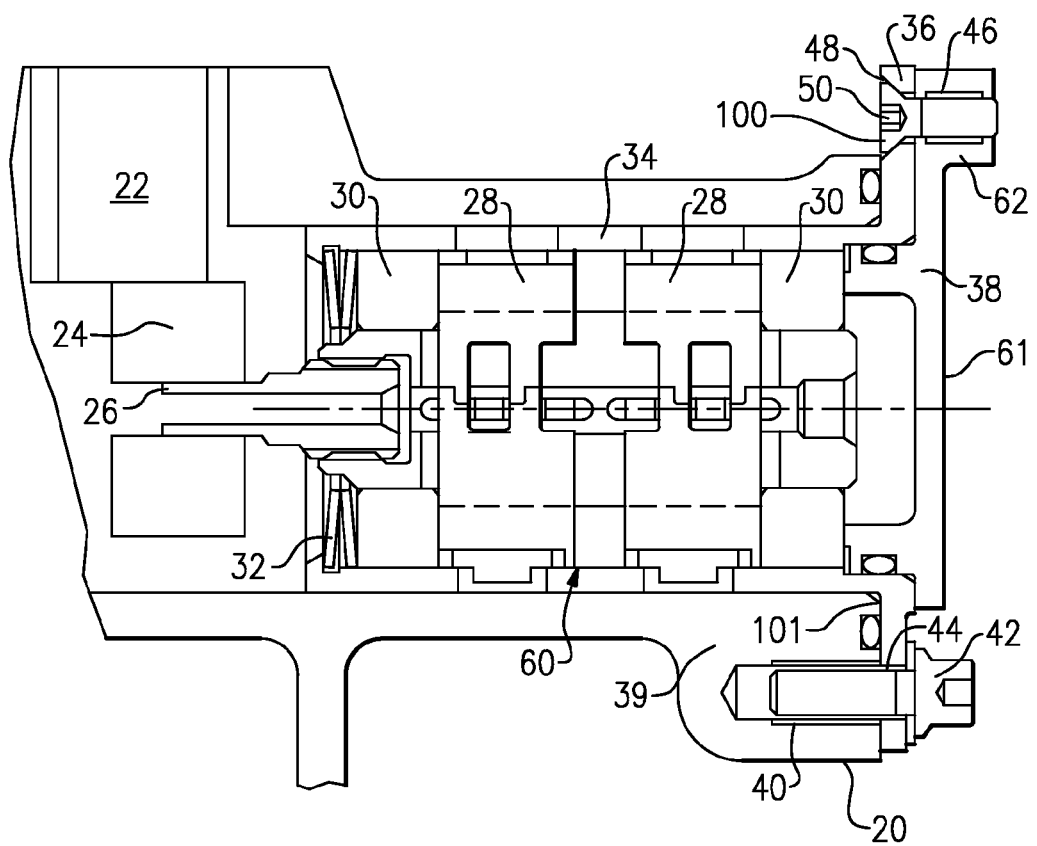
FIG. 1 shows a cross-sectional view through a lube pump assembled to a gearbox.

A gearbox 20, such as a gearbox for an APU includes a gear train 22, shown schematically. The gear train 22 is operable to drive a lube pump gear 24 which in turn drives a drive shaft 26 for a lube pump 60. The drive shaft 26 drives rotor vanes 28 to move lubricant to the gear train 22, as shown. Carbon bearings 30 are positioned at each side of the rotor 28 and within a lube pump housing 34. Belleville washers 32 act as a spring to bias internal components of the lube pump 60, forcing the bearings 30 and rotor vanes 28 against a retention plate 38. The retention plate 38 is secured to a lube pump flange 36 through a plurality of bolts 50. The bolts 50 are secured in countersunk holes 48 in the flange 36, and threaded holes 46 in the retention plate 38. Threaded holes 46 are formed in bosses 62 extending away from a nominal outer face 61 of the retention plate 38.

FIG. 1 shows the lube pump assembled to the gear box 20. As can be seen, the gear box 20 has a support surface 39 including threaded bores 40 which receive bolts 42 extending through holes 44 in the flange 36. The bolts 42 are accessible from outside of the gear box 20, while the bolts 50 would be sitting against a surface of the gear box 20, or otherwise not easily accessible from outside of the gear box 20. In a sense, this is true since the bolts 50 extend in an opposed direction to the bolts 42. As can be seen, a head 100 of the bolts 50 is positioned on the face 101 of the flange 36 that is remote from the retention plate 38.

Figure 2A:
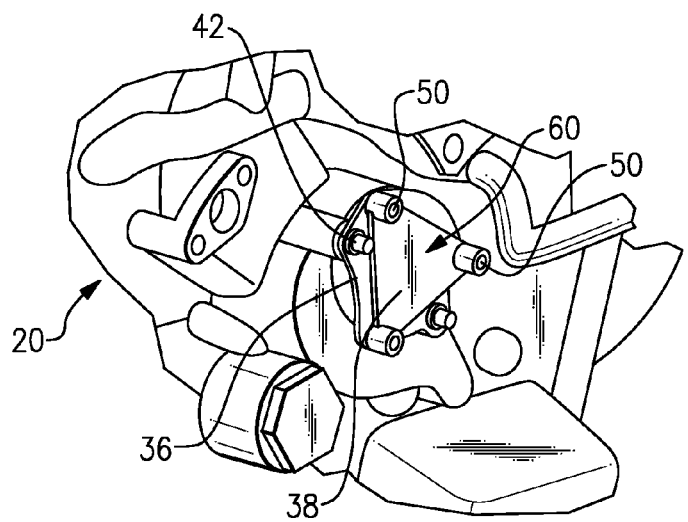
FIG. 2A shows the lube pump assembled into a portion of the gearbox.

As shown in FIG. 2A, the lube pump 60 has the retention plate 38 sitting outwardly of the flange 36. The ends of the bolts 50 are visible, but the heads are not, and thus the retention plate 38 cannot be removed from the flange 36 while installed on gearbox 20. Instead, the bolts 42 are accessible such that the lube pump 60 can be removed as a sub-assembly.

Figure 2B:
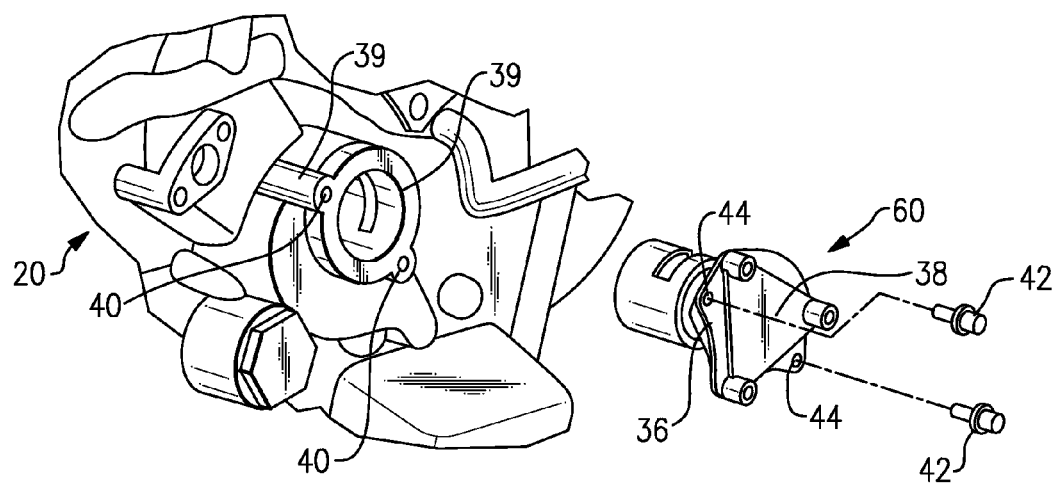
FIG. 2B shows a lube pump assembly removed from gearbox.

The removed lube pump assembly 60 is shown in FIG. 2B. The bolts 42 are simply removed and the assembled lube pump assembly 60 may be removed with the retention plate 38 still secured to the flange 36, maintaining lube pump assembly 60 as an assembled part.

Figure 3:
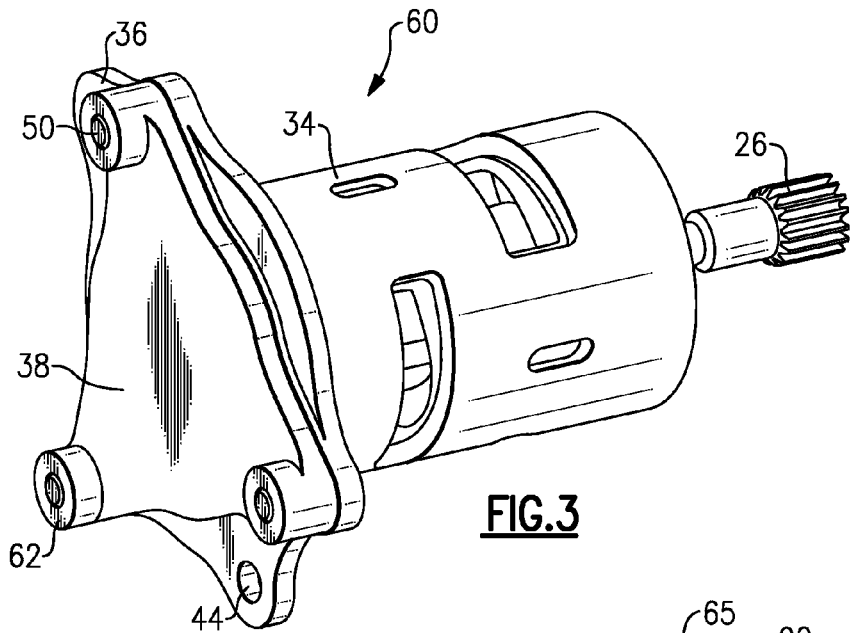
FIG. 3 shows the lube pump assembly.

As shown in FIG. 3, there are three bolts 50 and two bolt holes 44. Bosses 62 receive the ends of the bolts 50.

Figure 4:
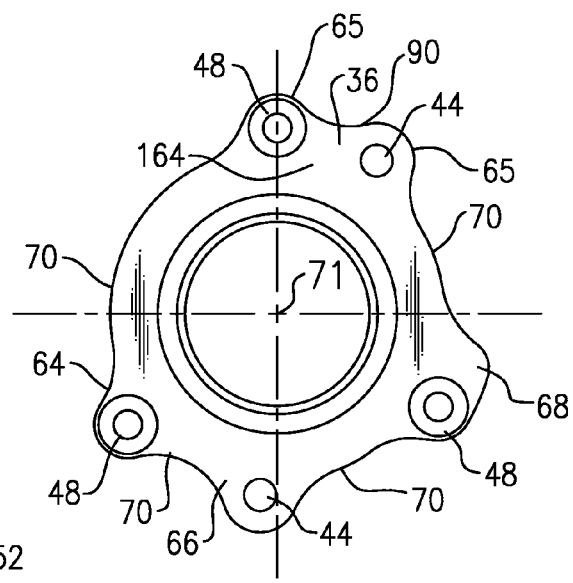
FIG. 4 shows one piece of the lube pump.

As shown in FIG. 4, the flange 36 includes three holes 48 which are countersunk, and two holes 44. Two of the holes 48, and one of the holes 44 are received in ears 64, 66, and 68 extending further outwardly of a central axis 71, than do intermediate portions 70 between the ears 64, 66, and 68. That is, the ears extend further from a central axis 71 than do the intermediate portions 70. One ear 164 receives both a bolt hole 48 and a hole 44. In ear 164, each of the holes 48 and 44 are received in sub-ears 65. Again, the ear 164 extends further from the central axis 71 than does the intermediate portions 70. The sub-ears 65 extend further radially outwardly from the central axis 71 than does an intermediate portion 90 of ear 164.

Figure 5:
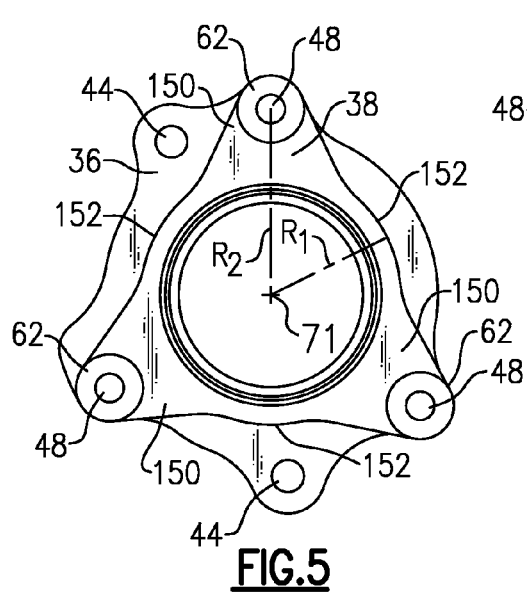
FIG. 5 shows another view of the assembled gear pump.

As shown in FIG. 5, the retention plate 38 is secured to the flange 36. The retention plate 38 has enlarged portions 150 which are generally triangular and receive the bolt holes 48. Nominal intermediate portions 152 are positioned between the enlarged portions 150. The nominal intermediate portions 152 are formed at a first radius $R_1$ away from a central axis 71. A radius $R_2$ can be defined to a center of the hole 48. In one embodiment, the radius $R_1$ is 0.875" (2.22 cm), while the radius $R_2$ is 1.27" (3.23 cm). In embodiments of this invention, a ratio of $R_1$ to $R_2$ is between 0.63 and 0.77.

As can be appreciated from all of the Figures, Belleville washers 32 bias the pump components against the retention plate 38. Thus, maintaining the lube pump 60 assembled limits the likelihood of the internal components separating with release of the Belleville washers 32.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A lube pump comprising:
a housing including a flange extending radially outwardly from a body of said housing;
at least one rotor received within said housing, and a shaft for powering said rotor extending away from said flange;
a retention plate positioned on an end of said flange closing said housing, said flange including first bolt holes for securing said flange to said retention plate, and second bolt holes for securing said flange to a gearbox;
a first set of bolts extending through said first bolt holes and securing said flange to said retention plate;
a second set of bolts for securing said flange to the gear box;
the first and second set of bolts extending in opposed directions; and
a bearing mounted at each of two axial sides of said at least one rotor, and said bearings also received within said housing.

2. The lube pump as set forth in claim 1, wherein said first bolt holes are countersunk on a face of said flange facing away from a face that abuts said retention plate.

3. The lube pump as set forth in claim 1, wherein a spring biases internal components of said pump, including said at least one rotor, towards said retention plate.

4. The lube pump as set forth in claim 1, wherein there are at least three of said first bolt holes, and at least two of said second bolt holes.

5. The lube pump as set forth in claim 4, wherein said first bolt holes, and said second bolt holes, are all formed in ears extending further outwardly from a central axis of said flange than intermediate sections of said flange circumferentially positioned about said central axis, and between said ears.

6. The lube pump as set forth in claim 5, wherein there are at least four of said ears, with at least one of said ears including one of said first bolt holes, and one of said second bolt holes.

7. The lube pump as set forth in claim 6, wherein said at least one of said ears includes two sub-ears extending further radially outwardly than does an intermediate part of said at least one ear positioned circumferentially between said one of said first bolt holes, and said one of said second bolt holes.

8. The lube pump as set forth in claim 7, wherein said retention plate includes generally cylindrical nominal outer peripheral intermediate portions spaced at a first radius from said central axis, and third bolt holes, aligned with said first bolt holes, and formed in said retention plate at enlarged portions which extend radially outwardly for a greater distance than do said intermediate portions of said retention plate.

9. The lube pump as set forth in claim 8, wherein a ratio of a radius to said intermediate portions, compared to a radius extending from said central axis of a center of said bolt holes is between 0.63 and 0.77.

10. The lube pump as set forth in claim 1, wherein said second set of bolts may be removed, with said first set of bolts still securing said flange to said retention plate, and such that said retention plate and said lube pump housing can be removed as an assembled unit from the gearbox.

11. A gear box comprising:
a gear train enclosed within a gear train housing;
a drive gear, said drive gear driving a drive shaft of a lube pump, and the lube pump including a lube pump housing having a flange extending radially outwardly from a body of said lube pump housing;
at least one pump rotor received within said lube pump housing;
a retention plate positioned on an end of said flange closing said lube pump housing;
a first set of bolts extending through first bolt holes in said flange and securing said flange to said retention plate;
a second set of bolts extending through second bolt holes in said flange and securing said flange to the gearbox housing, said second set of bolts further securing said retention plate to said gearbox housing; and
the first and second set of bolts extending in opposed directions.

12. The gearbox as set forth in claim 11, wherein said first bolt holes are countersunk on a face of said flange facing away from a face that abuts said retention plate.

13. The gearbox as set forth in claim 11, wherein a spring biases internal components of said pump, including said rotor, towards said retention plate.

14. The gear box as set forth in claim 11, wherein there are at least three of said first bolt holes, and at least two of said second holes, said first bolt holes, and said second bolt holes, are all formed in ears extending further outwardly from a central axis of said flange than intermediate sections of said flange circumferentially positioned about said central axis, and between said ears.

15. The gear box as set forth in claim 14, wherein there are at least four of said ears, with at least one of said ears including one of said first bolt holes, and one of said second bolt holes.

16. The gear box as set forth in claim 15, wherein said at least one of said ears includes two sub-ears extending further radially outwardly than does an intermediate part of said at least one ear positioned circumferentially between said one of said first bolt holes, and said one of said second bolt holes.

17. The gear box as set forth in claim 16, wherein said retention plate has generally cylindrical nominal outer peripheral intermediate portions spaced at a first radius from said central axis, and third bolt holes aligned with said first bolt holes, and formed in said retention plate at enlarged portions which extend radially outwardly for a greater distance than do said intermediate portions of said retention plate.

18. The gear box as set forth in claim 17, wherein a ratio of a radius to said intermediate portions, compared to a radius extending from said central axis of a center of said bolt holes is between 0.63 and 0.77.

19. The gear box as set forth in claim 11, wherein there is a bearing mounted at each of two axial sides of said at least one rotor, and said bearing also received within said housing.

20. The gear box as set forth in claim 11, wherein said second set of bolts may be removed, with said first set of bolts still securing said flange to said retention plate, and such that said retention plate and said lube pump housing can be removed as an assembled unit from said gear train housing.

* * * * *